United States Patent
Badanes et al.

(10) Patent No.: US 11,449,711 B2
(45) Date of Patent: Sep. 20, 2022

(54) MACHINE LEARNING-BASED DEFECT DETECTION OF A SPECIMEN

(71) Applicant: Applied Materials Israel Ltd., Rehovot (IL)

(72) Inventors: Ran Badanes, Rishon Le-Zion (IL); Ran Schleyen, Rehovot (IL); Boaz Cohen, Lehavim (IL); Irad Peleg, Tel Aviv (IL); Denis Suhanov, Ashdod (IL); Ore Shtalrid, Yavne (IL)

(73) Assignee: Applied Materials Isreal Ltd., Rehovot (IL)

( * ) Notice: Subject to any disclaimer, the term of this patent is extended or adjusted under 35 U.S.C. 154(b) by 170 days.

(21) Appl. No.: 16/733,219

(22) Filed: Jan. 2, 2020

(65) Prior Publication Data

US 2021/0209418 A1    Jul. 8, 2021

(51) Int. Cl.
*G06T 7/00*    (2017.01)
*G06K 9/62*    (2022.01)

(52) U.S. Cl.
CPC ......... *G06K 9/6259* (2013.01); *G06K 9/6263* (2013.01); *G06T 7/001* (2013.01); *G06T 2207/30148* (2013.01)

(58) Field of Classification Search
CPC ...... G06N 20/00; G06N 7/005; G06N 3/0454; G06N 3/006; G06N 3/0445; G06N 3/084; G06N 3/126; G06N 3/0472; G06N 3/088; G06N 3/08; G06N 20/20; G06N 3/02; G05B 23/0229; G05B 23/0294; G06K 9/6263; G06K 9/6262; G06K 9/6256; G06K 9/6257; G06K 9/6259; G06T 2207/20081;
(Continued)

(56) References Cited

U.S. PATENT DOCUMENTS

2007/0177135 A1 * 8/2007 Tuohy ................ G05B 23/0221
356/237.2
2017/0177997 A1 6/2017 Karlinsky et al.
(Continued)

FOREIGN PATENT DOCUMENTS

WO   WO-2020156769 A1 *  8/2020  ......... G03F 7/70491
WO   WO-2020180300 A1 *  9/2020  ........... G06F 21/552
WO   WO-2020217957 A1 * 10/2020

OTHER PUBLICATIONS

Machine translation via SEARCH of WO 2020/217957 to Sugaya S, 24 pages. (Year: 2022).*
(Continued)

*Primary Examiner* — Matthew C Bella
*Assistant Examiner* — Dennis Rosario
(74) *Attorney, Agent, or Firm* — Lowenstein Sandler LLP

(57) ABSTRACT

There is provided a method of defect detection on a specimen and a system thereof. The method includes: obtaining a runtime image representative of at least a portion of the specimen; processing the runtime image using a supervised model to obtain a first output indicative of the estimated presence of first defects on the runtime image; processing the runtime image using an unsupervised model component to obtain a second output indicative of the estimated presence of second defects on the runtime image; and combining the first output and the second output using one or more optimized parameters to obtain a defect detection result of the specimen.

20 Claims, 6 Drawing Sheets

(58) Field of Classification Search
CPC . G06T 2207/20084; G06T 2207/30148; G06T 7/0004; G06T 7/001; G06T 7/0002; G06V 10/82; G06V 10/454; G06V 2201/06; H01L 22/24
See application file for complete search history.

(56) References Cited

U.S. PATENT DOCUMENTS

| | | | |
|---|---|---|---|
| 2017/0308049 A1* | 10/2017 | Fujii | G05B 19/41875 |
| 2018/0101924 A1* | 4/2018 | Yamaguchi | G06N 20/00 |
| 2018/0107928 A1* | 4/2018 | Zhang | G06N 3/0454 |
| 2018/0293721 A1* | 10/2018 | Gupta | G01N 21/8851 |
| 2019/0104940 A1* | 4/2019 | Zhou | A61B 5/0073 |
| 2019/0220381 A1* | 7/2019 | Pogorelik | G06K 9/6263 |
| 2019/0303717 A1* | 10/2019 | Bhaskar | G06T 7/0004 |
| 2020/0161081 A1* | 5/2020 | Pathangi | H01J 37/28 |
| 2020/0166909 A1* | 5/2020 | Noone | G06N 20/00 |
| 2020/0410354 A1* | 12/2020 | Zejda | G06F 9/3861 |

OTHER PUBLICATIONS

Huang et al., "Densely Connected Convolutional Networks," Jan. 28, 2018, 9 pages.

* cited by examiner

MACHINE LEARNING-BASED DEFECT DETECTION OF A SPECIMEN

TECHNICAL FIELD

The presently disclosed subject matter relates, in general, to the field of examination of a specimen, and more specifically, to methods and systems for defect detection of a specimen.

BACKGROUND

Current demands for high density and performance, associated with ultra large scale integration of fabricated devices, require submicron features, increased transistor and circuit speeds, and improved reliability. Such demands require formation of device features with high precision and uniformity, which, in turn, necessitate careful monitoring of the fabrication process, including automated examination of the devices while they are still in the form of semiconductor wafers. It is noted that the fabrication process can include pre-manufacture, manufacture and/or post-manufacture operations.

The term "specimen" used in this specification should be expansively construed to cover any kind of wafer, masks, and other structures, combinations and/or parts thereof used for manufacturing semiconductor integrated circuits, magnetic heads, flat panel displays, and other semiconductor-fabricated articles.

The term "examination" used in this specification should be expansively construed to cover any kind of metrology-related operations as well as operations related to detection and/or classification of defects in a specimen during its fabrication. Examination is carried out by using non-destructive examination tools during or after manufacture of the specimen to be examined. By way of non-limiting example, the examination process can include runtime scanning (in a single or in multiple scans), sampling, reviewing, measuring, classifying and/or other operations provided with regard to the specimen or parts thereof using the same or different examination tools. Likewise, at least partial examination can be carried out prior to manufacture of the specimen to be examined, and can include, for example, generating an examination recipe(s), training respective classifiers or other machine learning-related tools and/or other setup operations. It is noted that, unless specifically stated otherwise, the term "examination" or its derivatives used in this specification, is not limited with respect to resolution or to the size of an inspection area. A variety of non-destructive examination tools includes, by way of non-limiting example, scanning electron microscopes, atomic force microscopes, optical inspection tools, etc.

By way of non-limiting example, run-time examination can employ a two phase procedure, e.g. inspection of a specimen followed by review of sampled locations of potential defects. During the first phase, the surface of a specimen is inspected at high-speed and relatively low-resolution. In the first phase, a defect map is produced to show locations on the specimen suspected of having high probability of a defect. During the second phase, at least some of such suspected locations are more thoroughly analyzed with relatively high resolution. In some cases both phases can be implemented by the same inspection tool, and, in some other cases, these two phases are implemented by different inspection tools.

Examination processes are used at various steps during semiconductor fabrication to detect and classify defects on specimens. Examination generally involves generating some output (e.g., images, signals, etc.) for a wafer by directing light or electrons to the wafer and detecting the light or electrons from the wafer. Once the output has been generated, defect detection is typically performed by applying a defect detection method and/or algorithm to the output. Most often, the goal of examination is to provide high sensitivity to defects of interest, while suppressing detection of nuisance and noise on the wafer.

GENERAL DESCRIPTION

In accordance with certain aspects of the presently disclosed subject matter, there is provided a method of defect detection on a specimen, the method performed by a processor and memory circuitry (PMC), the method comprising: obtaining a runtime image representative of at least a portion of the specimen; processing the runtime image using a supervised model component to obtain a first output indicative of estimated presence of first defects on the runtime image, wherein the supervised model component is trained using a first training set including at least a plurality of first images each representative of at least a portion of the specimen and corresponding label data indicative of first defect distribution on the first images; processing the runtime image using a unsupervised model component to obtain a second output indicative of estimated presence of second defects on the runtime image, wherein the unsupervised model is trained using a second training set including a plurality of second images each representative of at least a portion of the specimen, each second image being a reference image of a first image; and combining the first output and the second output using one or more optimized parameters to obtain a defect detection result of the specimen.

In addition to the above features, the method according to this aspect of the presently disclosed subject matter can comprise one or more of features (i) to (xiii) listed below, in any desired combination or permutation which is technically possible:

(i). The optimized parameters can be obtained during training using a third training set.

(ii). The first output can be a first grade map representative of estimated probabilities of the first defects on the runtime image, and the second output can be a second grade map representative of estimated probabilities of the second defects on the runtime image.

The combining can be performed using a segmentation model component operatively connected to the supervised and unsupervised model components, to obtain a composite grade map indicative of estimated probabilities of the first defects and the second defects on the specimen. The segmentation model component can be trained using the third training set based on outputs of the supervised model and unsupervised model.

(iii). The first output can be a first grade map representative of estimated probabilities of the first defects on the runtime image, and the second output can be a second grade map representative of estimated probabilities of the second defects on the runtime image.

The combining can comprise combining the first grade map and the second grade map with respective global weights to generate a composite grade map indicative of estimated probabilities of the first defects and the second defects on the specimen. The respective global weights can be optimized during training using the third training set.

(iv). The processing of the runtime image using a supervised model component can comprise generating a first grade map representative of estimated probabilities of the first defects on the runtime image and applying a first threshold to the first grade map to obtain a first defect map.

The processing of the runtime image using a unsupervised model component can comprise generating a second grade map representative of estimated probabilities of the second defects on the runtime image and applying a second threshold to the second grade map to obtain a second defect map, the first threshold and the second threshold being optimized during training using the third training set.

The combining can comprise combining the first defect map and the second defect map to generate a composite defect map.

(v). The global weights can be obtained using a non-gradient optimization function during training using the third training set.

(vi). The supervised model component can be trained by processing each first image to generate a corresponding first grade map representative of estimated probabilities of the first defects on the first image, and optimizing the supervised model component based on the label data corresponding to the first image.

(vii). The unsupervised model component can be trained by processing each second image to generate a corresponding second grade map representative of estimated probabilities of the second defects on the second image, and optimizing the unsupervised network based on the second grade map in relation to the second image.

(viii). The first training set can further include, for each first image, corresponding design data, and/or at least one reference image, and the obtaining can further comprise obtaining design data and/or at least one reference image of the runtime image.

(ix). The second training set can further include, for each second image, corresponding design data, and the obtaining can further comprise obtaining design data of the runtime image.

(x). The supervised model component and the unsupervised model component can be trained separately.

(xi). The method can further comprise obtaining, during runtime, one or more new first images each with label data indicative of presence of one or more new classes of defects, and retraining the supervised model component using the new first images.

(xii). The runtime image can be a review image generated by a review tool.

(xiii). The method can further comprise processing the runtime image using one or more additional supervised and/or unsupervised model components to obtain one or more additional outputs indicative of estimated presence of additional defects on the runtime image. The one or more additional supervised and/or unsupervised model components can be trained using one or more additional training sets including training images from different layers of the specimen and/or from different specimens.

In accordance with other aspects of the presently disclosed subject matter, there is provided a system of defect detection on a specimen, the system comprising a processor and memory circuitry (PMC) configured to: obtain a runtime image representative of at least a portion of the specimen; process the runtime image using a supervised model component to obtain a first output indicative of estimated presence of first defects on the runtime image, wherein the supervised model component is trained using a first training set including at least a plurality of first images each representative of at least a portion of the specimen, and corresponding label data indicative of first defect distribution on the first images; process the runtime image using a unsupervised model component to obtain a second output indicative of estimated presence of second defects on the runtime image, wherein the unsupervised model is trained using a second training set including a plurality of second images each representative of at least a portion of the specimen, each second image being a reference image of a first image; and combine the first output and the second output using one or more optimized parameters to obtain a defect detection result of the specimen.

This aspect of the disclosed subject matter can comprise one or more of features (i) to (xiii) listed above with respect to the method, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a method of defect detection on a specimen, the method comprising: obtaining a runtime image representative of at least a portion of the specimen; processing the runtime image using a supervised model component to obtain a first output indicative of estimated presence of first defects on the runtime image, wherein the supervised model component is trained using a first training set including at least a plurality of first images each representative of at least a portion of the specimen and corresponding label data indicative of first defect distribution on the first images; processing the runtime image using a unsupervised model component to obtain a second output indicative of estimated presence of second defects on the runtime image, wherein the unsupervised model is trained using a second training set including a plurality of second images each representative of at least a portion of the specimen, each second image being a reference image of a first image; and combining the first output and the second output using one or more optimized parameters to obtain a defect detection result of the specimen.

This aspect of the disclosed subject matter can comprise one or more of features (i) to (xiii) listed above with respect to the method, mutatis mutandis, in any desired combination or permutation which is technically possible.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "obtaining", "processing", "training", "combining", "optimizing", "generating", "applying", "retraining", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the defect detection system and respective parts thereof disclosed in the present application.

The terms "non-transitory memory" and "non-transitory storage medium" used herein should be expansively construed to cover any volatile or non-volatile computer memory suitable to the presently disclosed subject matter.

The term "defect" used in this specification should be expansively construed to cover any kind of abnormality or undesirable feature formed on or within a specimen.

The term "design data" used in the specification should be expansively construed to cover any data indicative of hierarchical physical design (layout) of a specimen. Design data can be provided by a respective designer and/or can be derived from the physical design (e.g. through complex simulation, simple geometric and Boolean operations, etc.). Design data can be provided in different formats as, by way of non-limiting examples, GDSII format, OASIS format, etc. Design data can be presented in vector format, grayscale intensity image format, or otherwise.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Figure 1:
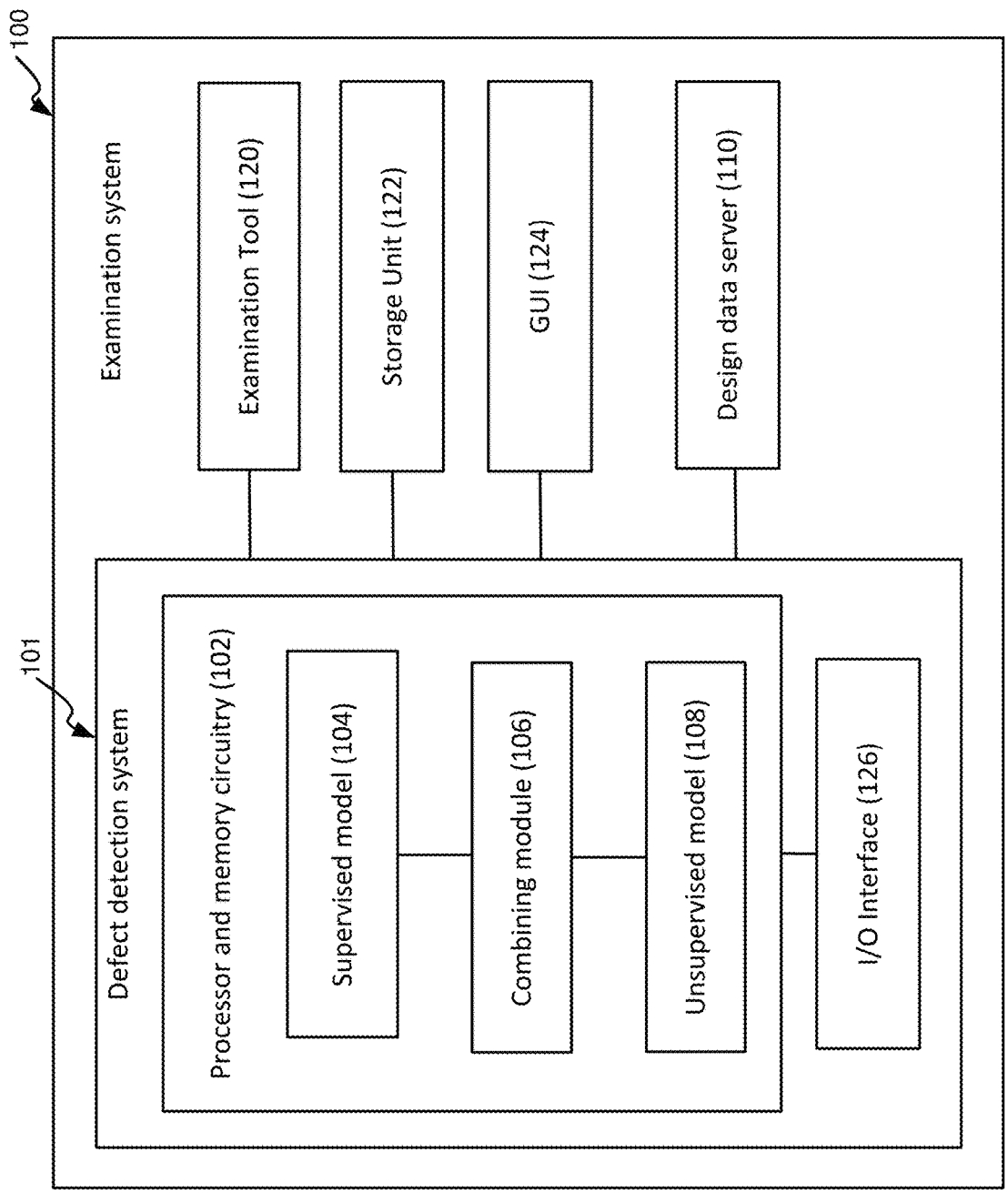
FIG. 1 illustrates a functional block diagram of a defect detection system in accordance with certain embodiments of the presently disclosed subject matter.

Bearing this in mind, attention is drawn to FIG. 1 illustrating a functional block diagram of a defect detection system in accordance with certain embodiments of the presently disclosed subject matter.

The examination system 100 illustrated in FIG. 1 can be used for examination of a specimen (e.g. of a wafer and/or parts thereof) as part of the specimen fabrication process. The illustrated examination system 100 comprises a computer-based system 101 capable of automatic defect detection in runtime. System 101 is also referred to as a defect detection system. System 101 can be operatively connected to one or more examination tools 120. The examination tools can be one or more low-resolution examination tools and/or one or more high-resolution examination tools and/or other examination tools. The examination tools are configured to capture images of the specimen and/or to review the captured image(s) and/or to enable or provide measurements related to the captured image(s). The system 101 can be further operatively connected to a design data server 110.

System 101 comprises a processor and memory circuitry (PMC) 102 operatively connected to a hardware-based I/O interface 126. PMC 102 is configured to provide all processing necessary for operating system 101 as further detailed with reference to FIG. 2 and comprises a processor (not shown separately) and a memory (not shown separately). The processor of PMC 102 can be configured to execute several functional modules/components in accordance with computer-readable instructions implemented on a non-transitory computer-readable memory comprised in the PMC. Such functional modules are referred to hereinafter as comprised in the PMC. Functional modules comprised in PMC 102 include a supervised model 104, an unsupervised model 108 and a combining module 106 which are operatively connected to each other.

As will be further detailed with reference to FIG. 2, system 101 is configured to receive, via I/O interface 126, input data. The input data can include image data (and/or derivatives thereof and/or metadata associated therewith) produced by the examination tools and/or data stored in design data server 110 and/or one or more data repositories. In some embodiments, the input data can include one or more runtime images. It is further noted that the runtime image data can include data related to a layer of interest and/or to one or more other layers of the specimen.

By way of non-limiting example, a specimen can be examined by one or more low-resolution examination tools (e.g. an optical inspection system, low-resolution SEM, etc.). The resulting data (referred to hereinafter as low-resolution image data) informative of low-resolution images of the specimen, can be transmitted—directly or via one or more intermediate systems—to system 101. Alternatively or additionally, the specimen can be examined by one or more high-resolution tools (e.g. a subset of potential defect locations selected for review can be reviewed by a scanning electron microscope (SEM) or Atomic Force Microscopy (AFM)). The resulting data (referred to hereinafter as high-resolution image data) informative of high-resolution images of the specimen, can be transmitted—directly or via one or more intermediate systems—to system 101.

It is noted that images of a desired location on a specimen can be captured at different resolutions. In some embodiments, images of the same location (with the same or different resolutions) can comprise several images registered therebetween (e.g. images captured from the given location and one or more reference images corresponding to the given location).

The supervised model 104 and the unsupervised model 108 as illustrated in FIG. 1 can be used to separately process the input data (e.g. a runtime image such as a low-resolution image and/or high-resolution image, optionally together with other data as, for example, design data, reference data, etc.). Specifically, the supervised model 104 can be configured to process the runtime image to obtain a first output indicative of estimated presence of first defects on the runtime image. The supervised model component can be pre-trained using a first training set including at least a plurality of first images each representative of at least a portion of the specimen and corresponding label data indicative of first defect distribution on the first images.

The unsupervised model 108 can be configured to process the runtime image to obtain a second output indicative of the estimated presence of second defects on the runtime image. The unsupervised model can be trained using a second training set including a plurality of second images each representative of at least a portion of the specimen. Each second image can be a reference image of a first image, as will be described below.

The combining module 106 can be configured to combine the first output and the second output using one or more optimized parameters to obtain a defect detection result of the specimen. In some embodiments, the optimized parameters can be obtained during training using a third training set.

Optionally, system 101 can comprise one or more additional supervised models and/or one or more additional unsupervised models (not illustrated in FIG. 1) to be used for processing the input data. By way of example, the runtime image can be processed by one or more additional unsupervised models to obtain one or more additional outputs indicative of the estimated presence of additional defects on the runtime image. The one or more additional unsupervised models are trained using one or more additional training sets including images from different layers of the specimen and/or from different specimens.

Upon processing the input data, system 101 can send the defect detection result to any of the examination tool(s), store the results (e.g. defect attributes, defect classification, etc.) in a storage unit 122, render the result via a computer-based graphical user interface (GUI) 124 and/or send it to an external system (e.g. Yield Management System (YMS) of a FAB). GUI 124 can be further configured to enable user-specified inputs related to operating system 101. Operation of system 101, PMC 102 and the functional modules therein will be further detailed with reference to FIG. 2.

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

Without limiting the scope of the disclosure in any way, it should also be noted that the examination tools can be implemented as inspection machines of various types, such as optical imaging machines, electron beam inspection machines and so on. In some cases the same examination tool can provide low-resolution image data and high-resolution image data. In some cases at least one examination tool can have metrology capabilities.

In some embodiments, the machine-learning based components referred to herein, such as the supervised model, unsupervised model, segmentation model, etc., can be implemented using any suitable machine learning based architecture, such as, e.g., neural networks, etc. By way of non-limiting example, the layers in the neural networks can be organized in accordance with Convolutional Neural Network (CNN) architecture, Recurrent Neural Network architecture, Recursive Neural Networks architecture, or otherwise. Each layer of a neural network can include multiple basic computational elements (CE) typically referred to in the art as dimensions, neurons, or nodes.

Generally, computational elements of a given layer can be connected with CEs of a preceding layer and/or a subsequent layer. Each connection between a CE of a preceding layer and a CE of a subsequent layer is associated with a weighting value. A given CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The given CE can be configured to compute an activation value (e.g. the weighted sum of the inputs) and further derive an output by applying an activation function to the computed activation. The activation function can be, for example, an identity function, a deterministic function (e.g., linear, sigmoid, threshold, or the like), a stochastic function, or any other suitable function. The output from the given CE can be transmitted to CEs of a subsequent layer via the respective connections. Likewise, as above, each connection at the output of a CE can be associated with a weighting value which can be applied to the output of the CE prior to being received as an input of a CE of a subsequent layer. Further to the weighting values, there can be threshold values (including limiting functions) associated with the connections and CEs.

The parameters (e.g., weighting and/or threshold values) of a neural network can be initially selected prior to training, and can be further iteratively adjusted or modified during training to achieve an optimal set of weighting and/or threshold values in the trained model. After each iteration, a difference can be determined between the actual output produced by the model and the target output associated with the respective training set of data. The difference can be referred to as an error value. Training can be determined to be complete when a cost function indicative of the error value is less than a predetermined value, or when a limited change in performance between iterations is achieved.

A set of input data used to adjust the weights/thresholds of the neural network is referred to hereinafter as a training set. It is noted that the teachings of the presently disclosed subject matter are not bound by the number and/or architecture of the networks.

It is noted that the examination system illustrated in FIG. 1 can be implemented in a distributed computing environment, in which the aforementioned functional modules shown in FIG. 1 can be distributed over several local and/or remote devices, and can be linked through a communication network. It is further noted that in other embodiments at least some of the examination tools 120, storage unit 122 and/or GUI 124 can be external to the examination system 100 and operate in data communication with system 101 via I/O interface 126. System 101 can be implemented as stand-alone computer(s) to be used in conjunction with the examination tools. Alternatively, the respective functions of the system 101 can, at least partly, be integrated with one or more examination tools.

Figure 2:
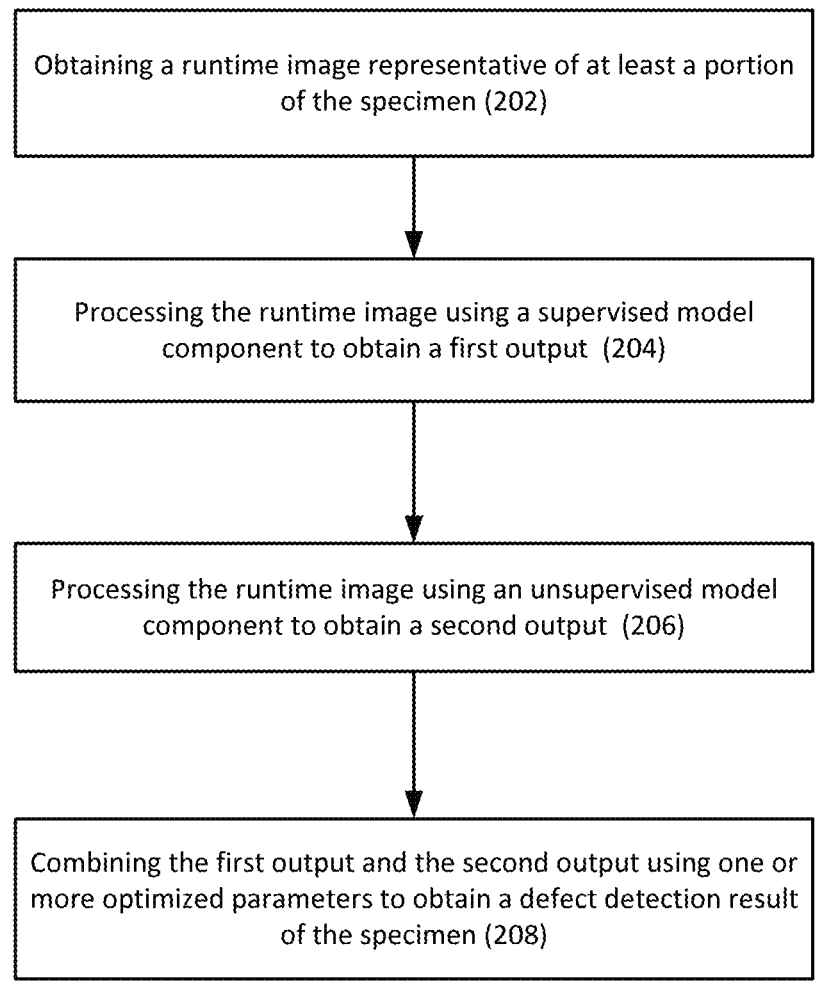
FIG. 2 illustrates a generalized flowchart of defect detection on a specimen in accordance with certain embodiments of the presently disclosed subject matter.

Referring to FIG. 2, there is illustrated a generalized flowchart of defect detection on a specimen in accordance with certain embodiments of the presently disclosed subject matter.

Input data including a runtime image representative of at least a portion of the specimen can be obtained (202) (e.g., by system 101 via I/O interface 126). The runtime image can be received from different examination modalities (e.g. from different examination tools, from different channels of the same examination tool as, for example, bright field and dark field images, from the same examination tool using different operational parameters, etc.)

For example, the runtime image can be from images of the specimen (e.g. a wafer, a die or parts thereof) captured during the manufacturing process, derivatives of the captured images obtained by various pre-processing stages (e.g. images of a part of a wafer or a photomask captured by SEM or an optical inspection system, SEM images roughly centered around the defect to be classified by ADC, SEM images of larger regions in which the defect is to be localized by ADR, registered images of different examination modalities corresponding to the same mask location, etc). By way of example, in some cases, the runtime image can be a review image which is typically with high resolution and obtained from a review tool, such as, e.g. a SEM image and/or derivative thereof.

By way of non-limiting example, the examination modalities can differ one from another by examination tools, different channels of the same examination tool, by operational parameters of the examination tools (e.g. by perspective and/or resolution provided by a certain examination tool/channel, etc.) and/or by a layer corresponding to the respective images. Alternatively or additionally, the examination modalities can differ one from another by the nature of obtaining the respective images—i.e. captured images, images derived thereof, pre-processed images (e.g. mean and/or diff images) and simulated images (including design-based images). Alternatively or additionally, the examination modalities can differ one from another by deriving techniques applied to the captured images (e.g. images derived by segmentation, defect contour extraction, height map calculation, etc.).

The runtime image can be processed (204) using a supervised model component (e.g., by the supervised model 104) to obtain a first output (also referred to herein as supervised output) indicative of the estimated presence of first defects on the runtime image. In some embodiments, the first output is a first grade map representative of estimated probabilities of the first defects on the runtime image (e.g., a probability map). In some cases, a threshold can be applied to the pixel values of the first grade map, giving rise to a first defect map indicative of the estimated presence of defects (e.g., a binary map indicative of the presence of defects or not). By way of example, the first grade map can include pixel values in the range of [0, 1], and a threshold of 0.6 can be applied to each pixel value in the grade map. Any pixel value that is larger than the threshold 0.6 can be marked as a defect with a value of 1 in the corresponding defect map. The supervised model component can be trained in a setup stage using a first training set including at least a plurality of first images each representative of at least a portion of the specimen and label data indicative of first defect distribution on the first images. The label data can be obtained from a review tool or from manual classification, and can include the location of defects on the first images and the class of defects.

Separately, the runtime image can be processed (206) using an unsupervised model component (e.g., by the unsupervised model 108) to obtain a second output (also referred to herein as unsupervised output) indicative of the estimated presence of second defects on the runtime image. In some embodiments, the second output is a second grade map representative of estimated probabilities of the second defects on the runtime image. In some cases, a threshold can be applied to the pixel values of the second grade map, giving rise to a second defect map indicative of the estimated presence of defects. The unsupervised network is trained using a second training set including a plurality of second images of the specimen, each second image being a reference image of a first image.

It is noted that in accordance with certain embodiments of the presently disclosed subject matter, the training sets used herein can include the entire available FAB data (e.g. CAD data, high resolution images, low resolution images, metadata, general attributes, etc.) related to all types of layers/products from all manufacturing phases. Alternatively, training can be performed over certain available FAB data selected in accordance with certain criteria (e.g. labeled/unlabeled/specific layer(s)/specific product(s)/specific class(s), etc.). The models can be further constantly trained (e.g. responsive to new classes introduced in the FAB or on a routine automatic procedure) in order to maintain its relevance to the constantly changing FAB data.

Accordingly to certain embodiments, the supervised model component and the unsupervised model component can be trained and optimized separately. For instance, they can be trained in parallel, or sequentially one after the other.

Figure 3:
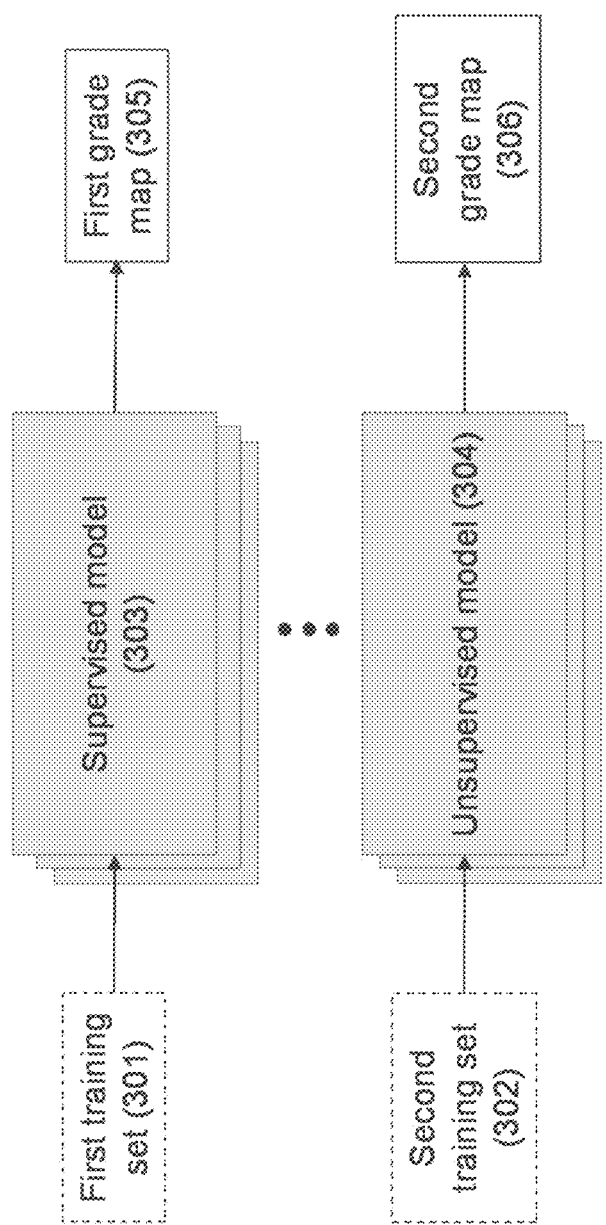
FIG. 3 is a schematic illustration of separately training a supervised model and an unsupervised model in accordance with certain embodiments of the presently disclosed subject matter.

Turning now to FIG. 3, there is shown a schematic illustration of separately training a supervised model and an unsupervised model in accordance with certain embodiments of the presently disclosed subject matter.

A first training set 301 is fed into a supervised model 303 for training the model. In some cases, the first training set 301 can be an a-priori labeled dataset which can be collected from the layer of interest or all previous layers that have been seen. The first training set can include at least a plurality of first images each representative of at least a portion of the specimen and corresponding label data indicative of first defect distribution on the first images. Similar to the runtime image, the first images can be images captured during the manufacturing process, or derivatives of the captured images obtained by various pre-processing stages (e.g. images of a part of a wafer or a photomask captured by SEM or an optical inspection system, etc.), which may or may not contain defects. Specifically, the supervised model 303 can be trained by processing each first image to generate a corresponding first grade map 305 representative of estimated probabilities of first defects on the first image, and optimize the supervised model based on the label data corresponding to the first image.

In some cases, a set of thresholds can be applied on the first grade map to generate corresponding defect maps. False alarm rate (FAR) and/or capture rate (CR) can be calculated based on the prediction results (e.g., the defect maps) and compared with an initial FAR as obtained from the labeled data or from the user for assessing the prediction performance of the supervised model. A threshold with the best FAR and/or CR can be selected to be used in subsequent training or in runtime.

Capture rate (also referred to herein as recall) refers to the ratio of the captured defects over the whole defect population. False alarm rate refers to the ratio of the declared nuisance over the total declared defects. Precision refers to the ratio of the number of DOI over the total declared defects. It is noted that the terms capture rate, recall, false alarm rate, precision etc. are known terminologies in the art and should be understood in its broadest interpretation. The definitions herein are for the purpose of exemplification and should not be construed as limiting the present disclosure in any way.

By way of example, the supervised model can be implemented using SVM, Deep neural network (DNN), etc. For instance, Convolutional Neural Network (CNN) or any suitable variations thereof can be used. For purpose of illustration, a CNN used herein can typically comprise one or more (e.g., in some cases, three or more) convolutional layers possibly followed by one or more (e.g., in some cases, two or more) fully connected layers. The output of the CNN can be a grade map of different resolutions, e.g., a pixel-level grade map, a blob-level grade map (in which case a post-processing of the pixel-level grade map, such as, e.g., clustering, may be performed), etc.

A second training set 302 is fed into an unsupervised model 304 for training the model. The second training set 302 includes a plurality of second images of the specimen. In some cases, the second training set can be a dataset of reference images without labeled data. The unsupervised model component can be trained by processing each second image to generate a corresponding second grade map 306 representative of estimated probabilities of second defects on the second image, and optimize the unsupervised network based on the second grade map in relation to the second image.

A reference image can be an image of a reference area of a specimen (e.g. die, cell, etc.) which contains the same patterns as in the image of interest (e.g., the first image), wherein the respective image data of the reference image is verified to represent the reference area that is clear of defects. The reference image can be an image captured from a reference (e.g., golden) die, reference cell or other area verified as being clear of defects. Alternatively or additionally, the reference image can be simulated using CAD data and/or can be augmented after capturing to exclude defects (if any) in the reference area.

By way of example, the unsupervised model can be implemented as a DNN such as, e.g., an autoencoder or any suitable variations/derivatives thereof. Autoencoder is a type of neural network which is normally used for the purpose of data reproduction by learning efficient data coding. An autoencoder always consists of two parts, the encoder and the decoder. The autoencoder learns to compress data from the input layer into a short code (i.e., the encoder part), and then decompress that code into an output that closely matches the original data (i.e., the decoder part). The autoencoder normally has an input layer, an output layer and one or more hidden layers connecting them. The output layer has the same number of nodes as the input layer with the purpose of reconstructing its own inputs. For each input image in the training dataset, the autoencoder can extract features representative of the input image, and, using the representative features, to reconstruct a corresponding output image which can be evaluated by comparing with the input image. The autoencoder is trained and optimized so as to learn the normal pattern distribution in the training images (which are reference images clear of defects, also referred to herein as defect-free images). A grade map can be calculated, e.g., as a difference between the input image and the output image of the autoencoder. Therefore in runtime, when a defective image (i.e., image with defects) arrives, the trained model can generate a defect-free version of it, since it was trained using defect-free images. The grade map, as a difference between the input and output, can indicate the presence of defects.

In some embodiments, during training, the first training set used to train the supervised model can further include, for each first image, corresponding design data, and/or at least one reference image. In some cases, the design data can include computer-generated design data-based images. Accordingly, the input data in runtime will correspond to the specific training data, and can include design data and/or at least one reference image of the runtime image in addition to the runtime image. By way of example, in some cases, the input data can include a runtime image and a corresponding reference image. In some other cases, the input data can include a runtime image and corresponding design data. In some further cases, the input data can include a runtime image, a corresponding reference image, and design data.

In some embodiments, the second training set used to train the unsupervised model can further include, for each second image, corresponding design data. Accordingly, in runtime, design data of the runtime image can be obtained in addition to the runtime image.

In some cases, the first and second training sets can include images collected from a single tool. In some other cases, the training sets can include images from an entire fleet (e.g., multiple tools) so as to increase system immunity to tool and wafer variances.

Figure 4:
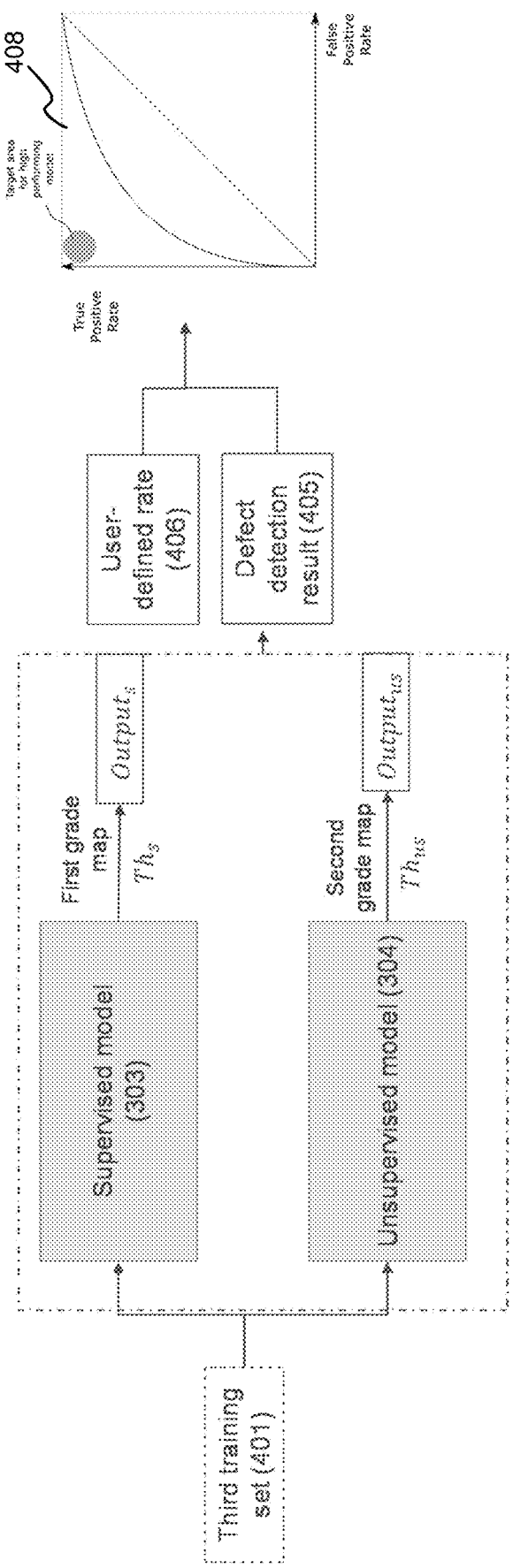
FIG. 4 is a schematic illustration of combining the outputs of supervised and unsupervised models and optimization thereof in accordance with certain embodiments of the presently disclosed subject matter.

Once the supervised model and unsupervised model are separately trained, the outputs of the two models need to be combined (208) (e.g., by the combining module 106) so as to provide an overall defect detection result. The combining of the outputs can use one or more optimized parameters which are obtained during training using a third training set. The combination can be performed in various ways in order to optimize the detection results. Turning now to FIG. 4, there is shown a schematic illustration of combining the outputs of supervised and unsupervised models and optimization thereof in accordance with certain embodiments of the presently disclosed subject matter.

A third training set 401 (e.g., a validation set) can be used for purpose of validating and optimizing the combination. The validation set can include a plurality of validation images and corresponding label data.

According to certain embodiments, after processing an image, the supervised model 303 and unsupervised model 304 output the first grade map and the second grade map respectively. A respective threshold (denoted as $Th_s$ to be used for the supervised model, and $Th_{us}$ to be used for the unsupervised model, as illustrated in FIG. 4) can be applied to each grade map in order to generate a defect detection output, e.g., a defect map (denoted as $Output_s$ for the supervised model, and $Output_{us}$ for the unsupervised model, as illustrated in FIG. 4). The thresholds can be initially selected during the separate training phase as described above with reference to FIG. 3. According to certain embodiments of the present disclosure, the initially selected threshold of each (or at least one) model can be tuned so as to optimize the capture rate and false alarm rate of the model. In this case, the optimized parameters used for the combination, as mentioned above, are the optimized threshold(s), which can be applied to the corresponding grade map to obtain an optimized defect map. The optimized defect maps of both models can be combined to generate an overall defect detection result 405.

Specifically, in such cases, the validation set can be used to tune the threshold of one or both of the models according to user-defined capture rate and/or false alarm rate 406. By way of example, a validation image can be processed by both models. If an expected capture rate is pre-defined by the user (e.g., 90%), the thresholds of both models can be increased so as to minimize the false alarm rates, as long as the user-defined capture rate is not compromised. On the other hand, if an expected false alarm rate is pre-defined by the user, the thresholds of both models can be decreased so as to increase the capture rate, as long as the user-defined false rate is not compromised. A graph 408 illustrating the performance of the models with reference to true positive rate (i.e., capture rate) and false positive rate (i.e., false alarm rate) is shown in FIG. 4. As illustrated, a high performance model would have a high true positive rate and a low false positive rate, which would be within the top left target area. This means that most predictions of the model are consistent with the ground truth, and most of the declared defects are detected.

By way of another example, under the assumption that the supervised model, once trained, can catch/detect most of the defects in the validation set, it is proposed, in accordance with certain embodiments of the present disclosure, to lock the threshold $Th_s$ of the supervised model and optimize the unsupervised model's threshold $Th_{us}$, so as to be able to detect as many unseen defects as possible while still meeting a pre-defined FAR by the user. Therefore, the threshold of the unsupervised model can be decreased as much as possible to detect unseen defects so as to maximize the capture rate, as long as the predefined FAR is not compromised.

In such cases, the thresholds of the models can be tuned so as to optimize capture rate and false alarm rate thereof. In runtime, the tuned thresholds, as the optimized parameters, can be applied to the outputs of the corresponding models (e.g., $Th_s$ is applied to the supervised model output, and $Th_{us}$ is applied to the unsupervised model output), and a defect can be declared if a pixel value in either grade map exceeds the respective threshold.

Figure 5:
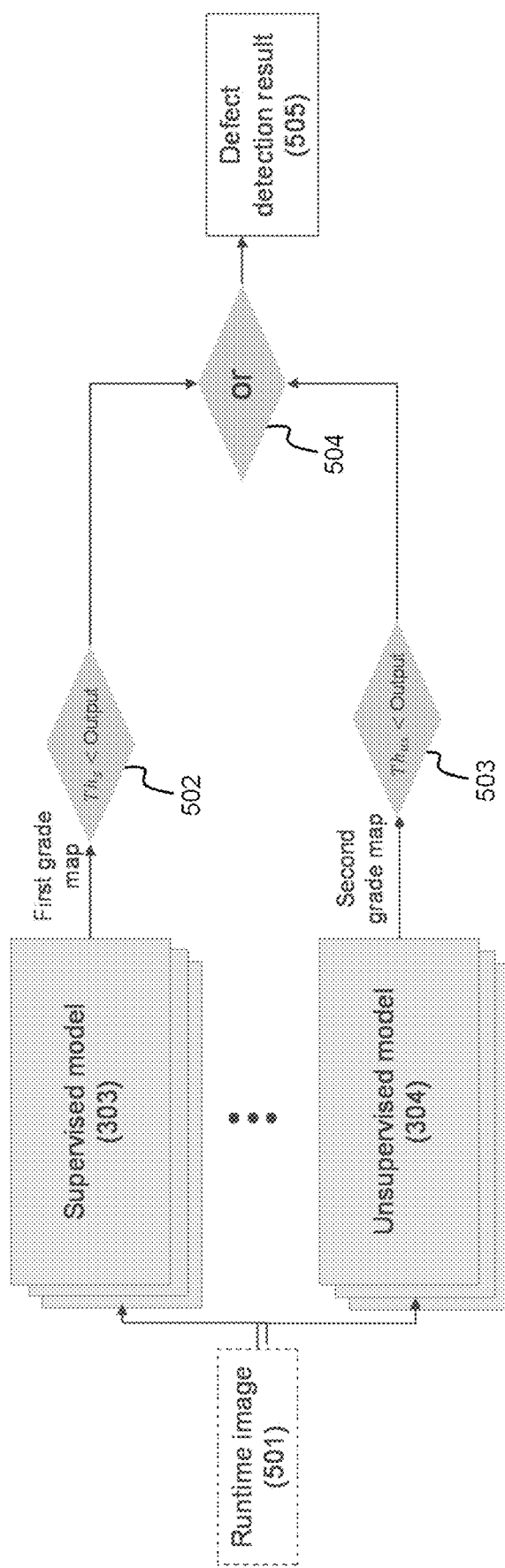
FIG. 5 illustrates an example of a runtime defect detection process using optimized thresholds in accordance with certain embodiments of the presently disclosed subject matter.

FIG. 5 illustrates an example of a runtime defect detection process using optimized thresholds in accordance with certain embodiments of the presently disclosed subject matter. A runtime image 501 is received and processed by the trained supervised model 303 and the trained unsupervised model 304, giving rise to the first grade map and the second grade map respectively. The optimized threshold of the supervised model $Th_s$, as obtained through the optimization stage as described above, is applied to the first grade map (see 502). Similarly, the optimized threshold of the unsupervised model $Th_{us}$ is applied to the second grade map (see 503). The thresholded outputs (e.g., defect maps) can be combined (e.g., through the logical operation OR 504) to obtain a defect detection result 505. By way of example, the pixel values in the first grade map that exceed the threshold $Th_s$ and the pixel values in the second grade map that exceed the threshold $Th_{us}$ are combined to be declared as defects. The pixel values that do not exceed any of the thresholds are regarded as false alarms, and will be filtered out.

Alternatively, according to certain embodiments, the outputs of both models can be combined using a non-gradient optimization function. The selection of such optimization function relates to the fact that thresholding is a non-differentiable function. Through the optimization, a global weight can be determined for assigning to each grade map. By way of example, the non-gradient optimization function can be selected from a group comprising: Particle Swarm Optimization (PSO), genetic algorithms, or any suitable combination thereof. In one example, PSO is selected as the optimization function. PSO is a computational method that optimizes a problem by iteratively trying to improve a candidate solution with regard to a given measure of quality. It solves a problem by having a population of candidate solutions (dubbed particles) and moving these particles around in the search-space according to a mathematical formula over the particle's position and velocity.

In the present case, each particle can represent the weights assigned for each grade map (e.g., $\alpha_i$ assigned for the supervised grade map, and $1-\alpha_i$ assigned for the unsupervised grade map). For each image in the validation set, different values of $\alpha_i$ can be tried and a score can be calculated based on the corresponding precision (i.e., pr) and recall, e.g.,: Score=min$\{(1-pr)^2 \beta+(1-recall)^2\}$. $\beta \geq 1$, is a predefined parameter determined by the user for indicating preferences of precision over recall, and vice versa. The score can be minimized in order to maximize the precision rate and recall rate. The $\alpha_i$ that corresponds to the minimized score can be determined. Therefore, a set of $\alpha_i$ that minimize the scores are determined corresponding to the set of validation images. In order to get a global weight $\alpha$, a weight factor for each $\alpha_i$ can be calculated as:

$$\text{weight factor} = \frac{1}{\text{score} + \epsilon},$$

and the set of $\alpha_i$ can be combined using a weighted averaging function according to the respective weight factors so as to obtain the global weight $\alpha$.

Once the global weight is determined, it can be used as the optimized parameters in runtime for combining the grade maps of the supervised and unsupervised models to generate a composite grade map. For instance, composite grade Map=Grades$_{unsupervised}$*$\alpha$+Grades$_{supervised}$(1-$\alpha$).

Alternatively, according to further embodiments, the outputs of both models can be combined using a segmentation model component (also referred to herein as segmentation model) operatively connected to the supervised and unsupervised model components. Similarly, the segmentation model can be implemented using any suitable machine learning based architecture, such as, e.g., neural networks.

Figure 6:
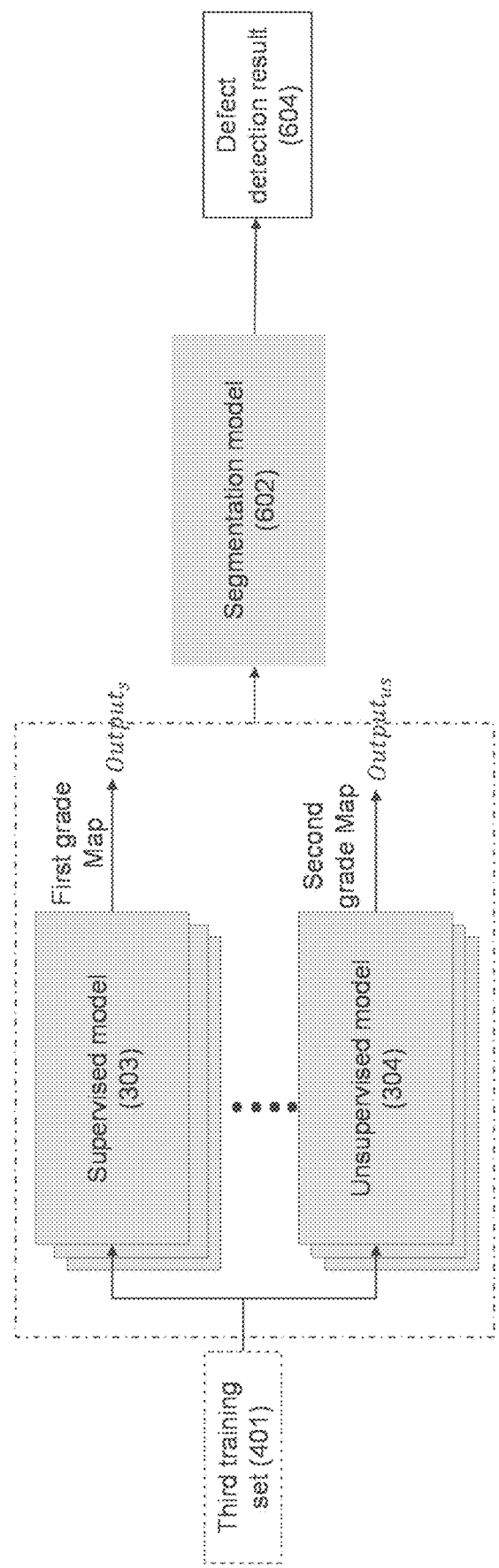
FIG. 6 illustrates a schematic block diagram of combining the outputs of supervised and unsupervised models using a segmentation model in accordance with certain embodiments of the presently disclosed subject matter.

Turning now to FIG. 6, there is illustrated a schematic block diagram of combining the outputs of supervised and unsupervised models using a segmentation model in accordance with certain embodiments of the presently disclosed subject matter.

As illustrated, a segmentation model 602 is operatively connected to the supervised model 303 and the unsupervised model 304. The segmentation model 602 can be trained using a third training set 401 (also referred to as a validation set) based on the outputs of the supervised model 303 and unsupervised model 304. As aforementioned, the validation set includes a set of validation images and corresponding label data. Specifically, a validation image can be fed into the trained supervised and unsupervised models, and the outputs of both models can be provided as input to the segmentation model 602. The segmentation model learns to combine the outputs of both models and generates a combined/composite grade map, which, after thresholding, can be compared with ground truth data (e.g., the labeled data corresponding to the validation image). The parameters in the segmentation model 602 can be optimized through minimizing the difference between the prediction and the ground truth. The threshold to be applied on the composite grade map can also be tuned during training so as to get an optimized capture rate and/or false alarm rate. In such a way, the segmentation model can be trained to learn how to best combine the outputs of both models, and provide an optimized defect detection result 604.

In runtime, the trained segmentation model works in a similar manner. By way of example, the input to the segmentation model can be the first and second grade maps, and the output of the model can be a combined/composite grade map. A threshold as determined during training can be applied on the composite grade map so as to obtain a defect detection result (e.g., a defect map).

In some embodiments, the validation set can be selected to include defective images (images containing defects) and non-defective images (images free of defects) according to statistics in production time. By way of example, the validation set can comprise 95% defective images and 5% non-defective images. A high capture rate can be used in order to achieve satisfying results during training.

As aforementioned, the runtime image can be possibly processed by one or more additional supervised and/or unsupervised models which are trained using one or more additional training sets including training images from different layers of the specimen and/or from different specimens. Accordingly, one or more additional outputs indicative of the estimated presence of additional defects on the runtime image can be obtained and combined to generate an overall defect detection result.

In some cases, on-the-fly feedback can be provided in order to improve detection performance. For instance, images that the unsupervised model detects as containing defects and the supervised model does not detect, can be selected for the purpose of retraining and fine-tuning the models. This mechanism can improve the immunity of the models to minority defect classes (i.e., rare defects which do not have much statistics, and should be sampled more carefully). By continuously collecting data from production time and using the collected data to retrain the system, the performance of the supervised mechanism can be improved, and the balance between the supervised and unsupervised mechanisms may shift to favoring the supervised mechanism.

Thus, as illustrated above, the proposed system, comprising two or more supervised and unsupervised models, as well as the combination and optimization thereof, is capable of detecting defects, which may or may not have been seen during training (the unsupervised model can be used as a safety net for detection of unseen anomalies), thereby providing improved defect detection results.

Among further advantages of certain embodiments of the presently disclosed subject matter is enabling capture of new class of defects facilitated by the unsupervised model.

Among further advantages of certain embodiments of the presently disclosed subject matter is high robustness and capture rate to a variety of different classes of defects through periodic retraining of the models in runtime.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

What is claimed is:

1. A computerized method for runtime defect detection on a specimen, the computerized method being performed by a processor and memory circuitry (PMC), the computerized method comprising:

obtaining a runtime image representative of at least a portion of the specimen;

processing, in a runtime phase, the runtime image using a supervised model component to obtain a first output indicative of estimated presence of first defects on the runtime image in the runtime phase, wherein the supervised model component is previously trained in a training phase prior to the runtime phase using a first training set comprising a plurality of first images each representative of the specimen and corresponding label data indicative of first defect distribution on the plurality of first images;

separately processing, in the runtime phase, the runtime image using an unsupervised model component to obtain a second output indicative of estimated presence of second defects on the runtime image in the runtime phase, wherein the unsupervised model component is previously trained in the training phase using a second training set including a plurality of second images each representative of the specimen, each second image of the plurality of second images being a defect-free reference image of a first image of the plurality of first images; and combining the first output and the second output using one or more optimized parameters to obtain a runtime defect detection result of the specimen.

2. The computerized method according to claim 1, wherein the one or more optimized parameters are obtained during training using a third training set.

3. The computerized method according to claim 2, wherein:

the first output is a first grade map representative of estimated probabilities of the first defects on the runtime image, and the second output is a second grade map representative of estimated probabilities of the second defects on the runtime image;

the combining of the first output and the second output is performed using a segmentation model component operatively connected to the supervised model component and the unsupervised model component, to obtain a composite grade map indicative of estimated probabilities of the first defects and the second defects on the specimen; and the segmentation model component is trained using the third training set based on outputs of the supervised model component and the unsupervised model component.

4. The computerized method according to claim 2, wherein:

the first output is a first grade map representative of estimated probabilities of the first defects on the runtime image, and the second output is a second grade map representative of estimated probabilities of the second defects on the runtime image;

the combining of the first output and the second output comprises combining the first grade map and the second grade map with respective global weights to generate a composite grade map indicative of estimated probabilities of the first defects and the second defects on the specimen; and the respective global weights are optimized during the training using the third training set.

5. The computerized method according to claim 2, wherein:
- the processing of the runtime image using the supervised model component comprises generating a first grade map representative of estimated probabilities of the first defects on the runtime image and applying a first threshold to the first grade map to obtain a first defect map;
- the separately processing of the runtime image using the unsupervised model component comprises generating a second grade map representative of estimated probabilities of the second defects on the runtime image, and applying a second threshold to the second grade map to obtain a second defect map, the first threshold and the second threshold being optimized during the training using the third training set; and
- the combining of the first output and the second output comprises combining the first defect map and the second defect map to generate a composite defect map.

6. The computerized method according to claim 4, wherein the respective global weights are obtained using a non-gradient optimization function during the training using the third training set.

7. The computerized method according to claim 1, wherein the supervised model component is trained by processing each first image of the plurality of first images to generate a corresponding first grade map representative of estimated probabilities of the first defects on the first image, and optimizing the supervised model component based on the label data corresponding to the first image.

8. The computerized method according to claim 1, wherein the unsupervised model component is trained by processing each second image of the plurality of second images to generate a corresponding second grade map representative of estimated probabilities of the second defects on the plurality of second images, and optimizing the unsupervised model component based on the second grade map in relation to the plurality of second images.

9. The computerized method according to claim 1, wherein the first training set further includes, for each first image of the plurality of first images, corresponding design data, and/or at least one reference image, and the obtaining further comprises obtaining at least one of design data or at least one reference image of the runtime image.

10. The computerized method according to claim 1, wherein the second training set further includes, for each second image of the plurality of second images, corresponding design data, and the obtaining further comprises obtaining design data of the runtime image.

11. The computerized method according to claim 1, wherein the supervised model component and the unsupervised model component are trained separately.

12. The computerized method according to claim 1, further comprising obtaining, during runtime, one or more new first images each with label data indicative of presence of one or more new classes of defects, and retraining the supervised model component using the new first images.

13. The computerized method according to claim 1, wherein the runtime image is a review image generated by a review tool.

14. The computerized method according to claim 1, further comprising processing the runtime image using one or more additional components of supervised or unsupervised model components to obtain one or more additional outputs indicative of estimated presence of additional defects on the runtime image, wherein the one or more additional components are trained using one or more additional training sets including training images from at least one of different layers of the specimen or from different specimens.

15. A computerized system of runtime defect detection on a specimen, the computerized system comprising a processor and memory circuitry (PMC) configured to:
- obtain a runtime image representative of at least a portion of the specimen;
- process, in a runtime phase, the runtime image using a supervised model component to obtain a first output indicative of estimated presence of first defects on the runtime image in the runtime phase, wherein the supervised model component is previously trained in a training phase prior to the runtime phase using a first training set comprising a plurality of first images each representative of the specimen and corresponding label data indicative of first defect distribution on the plurality of first images;
- separately process, in the runtime phase, the runtime image using an unsupervised model component to obtain a second output indicative of estimated presence of second defects on the runtime image in the runtime phase, wherein the unsupervised model component is previously trained in the training phase using a second training set including a plurality of second images each representative of the specimen, each second image of the plurality of second images being a defect-free reference image of a first image of the plurality of first images; and
- combine the first output and the second output using one or more optimized parameters to obtain a runtime defect detection result of the specimen.

16. The computerized system according to claim 15, wherein the one or more optimized parameters are obtained during training using a third training set.

17. The computerized system according to claim 16, wherein:
- the first output is a first grade map representative of estimated probabilities of the first defects on the runtime image, and the second output is a second grade map representative of estimated probabilities of the second defects on the runtime image;
- the PMC is configured to combine the first output and the second output using a segmentation model component operatively connected to the supervised model component and the unsupervised model component, to obtain a composite grade map indicative of estimated probabilities of the first defects and the second defects on the specimen; and
- the segmentation model component is trained using the third training set based on outputs of the supervised model component and the unsupervised model component.

18. The computerized system according to claim 16, wherein:
- the first output is a first grade map representative of estimated probabilities of the first defects on the runtime image, and the second output is a second grade map representative of estimated probabilities of the second defects on the runtime image; and
- the PMC is configured to combine the first output and the second output by combining the first grade map and the second grade map with respective global weights to generate a composite grade map indicative of estimated probabilities of the first defects and the second defects on the specimen; and the respective global weights are optimized during the training using the third training set.

19. The computerized system according to claim 16, wherein:
- the PMC is configured to process the runtime image using the supervised model component by generating a first grade map representative of estimated probabilities of the first defects on the runtime image and applying a first threshold to the first grade map to obtain a first defect map;
- the PMC is configured to separately process the runtime image using the unsupervised model component by generating a second grade map representative of estimated probabilities of the second defects on the runtime image and applying a second threshold to the second grade map to obtain a second defect map, the first threshold and the second threshold being optimized during the training using the third training set; and
- the PMC is configured to combine the first output and the second output by combining the first defect map and the second defect map to generate a composite defect map.

20. A non-transitory computer readable storage medium tangibly embodying a program of instructions that, when executed by a computer, cause the computer to perform a method of runtime defect detection on a specimen, the method comprising:

- obtaining a runtime image representative of at least a portion of the specimen;
- processing, in a runtime phase, the runtime image using a supervised model component to obtain a first output indicative of estimated presence of first defects on the runtime image in the runtime phase, wherein the supervised model component is previously trained in a training phase prior to the runtime phase using a first training set comprising a plurality of first images each representative of the specimen and corresponding label data indicative of first defect distribution on the plurality of first images;
- separately processing, in the runtime phase, the runtime image using an unsupervised model component to obtain a second output indicative of estimated presence of second defects on the runtime image in the runtime phase, wherein the unsupervised model component is previously trained in the training phase using a second training set including a plurality of second images each representative of the specimen, each second image of the plurality of second images being a defect-free reference image of a first image of the plurality of first images; and
- combining the first output and the second output using one or more optimized parameters to obtain a runtime defect detection result of the specimen.

* * * * *